United States Patent

[11] 3,551,768

| [72] | Inventor | Jean-Claude Lagier<br>Onex-Geneva, Switzerland |
| --- | --- | --- |
| [21] | Appl. No. | 732,624 |
| [22] | Filed | May 28, 1968 |
| [45] | Patented | Dec. 29, 1970 |
| [73] | Assignee | Mefina S. A. Fribourg<br>Switzerland<br>a corporation of Switzerland |
| [32] | Priority | May 31, 1967 |
| [33] | | Switzerland |
| [31] | | No. 7730/67 |

[54] ADJUSTING SYSTEM FOR UNIVERSAL MOTORS
2 Claims, 1 Drawing Fig.

[52] U.S. Cl. .................................................... 318/245, 318/345
[51] Int. Cl. ..................................................... H02p 5/00
[50] Field of Search ........................................ 323/94; 318/511, 514, 345, 248, 245; 323/22SCR; 307/252

[56] References Cited
UNITED STATES PATENTS
3,346,874  10/1967  Howell .................... (323/22SCR)
3,405,345  10/1968  Someda et al. ........... 323/22(SCR)

*Primary Examiner*—Oris L. Rader
*Assistant Examiner*—Robert J. Hickey
*Attorney*—Waters, Roditi, Schwartz & Nissen ABSTRACT: A system for adjusting under similar conditions an alternating current motor fed by mains of different voltages, wherein the thyristor or the like means controlling the feed of the motor is energized through a Zener diode which is in its turn fed by the discharge of a condenser. The latter is connected with an element having a nonlinear characteristic curve such as a resistance of the VDR type, which compensates the influence of the nominal voltages of the different mains.

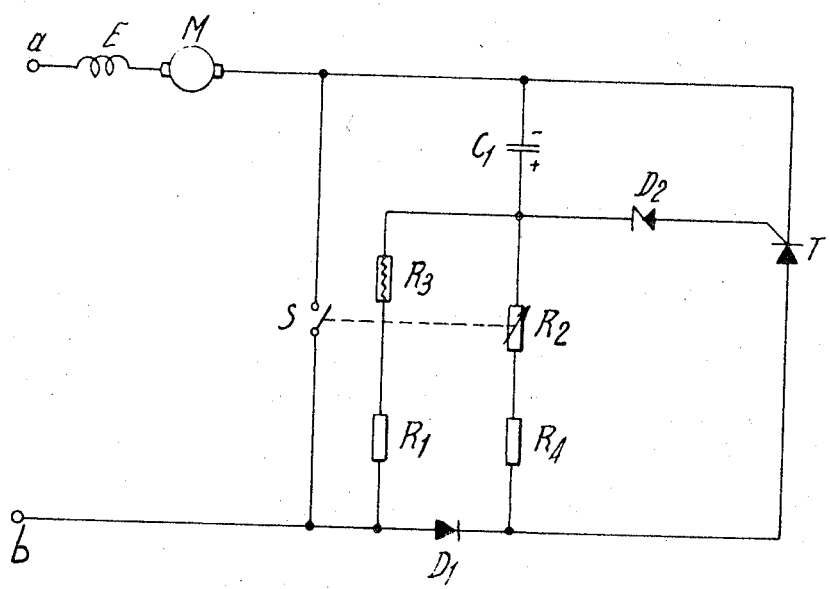

ADJUSTING SYSTEM FOR UNIVERSAL MOTORS

The present invention is directed to an improvement in the adjusting system for universal motors fed with alternating current disclosed in our copending Application No. 611,983, now Pat. No. 3,466,521 wherein the motor is fed through at least one controlled diode the moment of ignition of which is defined by a control circuit including at least one condenser inserted in series with a variable resistor, and is characterized by a connection between the ignition electrode of the controlled diode and a point between the variable resistor and the condenser, while at least one further diode and one auxiliary resistor are inserted in a manner such as to provide different time constants for the condenser during the opposite alternations of each period of the feed voltage.

It should be noted that the voltage of the electric mains is not the same in all countries. Generally such voltages are equal to 110, 125 or 220 volts. Electric appliances incorporating an electric motor should therefore be designed so as to be capable of operating with the voltage of the country to be considered.

In certain cases, the producers have provided two-voltage motors which may be used selectively, i.e., with a voltage of 110 volts and with a voltage of 220 volts, through a mere switching of the energizing winding. When the electric motor is provided with an electronic adjusting system the latter should be designed so as to take into account the voltage actually feeding the motor and this makes the task of the producer more difficult. It is therefore of advantage to resort to a same type of adjusting system without having to take into account the voltage with which the electric motor is to operate.

The present invention has for its object a single adjusting system of the type in applicant's prior application and suitable for both voltages feeding selectively a two-voltage motor while practically the same curve of speed vs. the value given to the variable resistor is obtained for either of said voltages. Of course, the same advantages are obtained in the case where the same adjusting system is provided for motors operating solely with one voltage, whether 110 or 220 volts.

According to the present invention, this object is achieved by selecting for at least one of the components connected with the condenser of the adjusting system a component having a symmetrical nonlinear characteristic curve.

The single FIG. of the accompanying drawings illustrates in a diagrammatic manner and by way of example a preferred embodiment of an adjusting system according to the invention.

The diagrammatic accompanying FIG. is a modification of the diagram of applicant's above-mentioned prior application (FIG. 1). A commutator motor M the energizing winding E of which is inserted in series is fed by a supply of alternating current connected across the terminals $a$ and $b$. The current feeding the motor is controlled by thyristor or controlled diode T and of which the gate is connected through the agency of a Zener diode D2 one terminal of a condenser C1 of which the other terminal is connected with the terminal $a$ of the motor.

The terminal $b$ is connected with said one terminal of the condenser C1 through a resistor R1, in series with a resistor R3 having a nonlinear characteristic curve of the VDR type. The condenser C1 is also connected with said terminal $b$ through a diode D1 and a variable resistor R2 in series with an unvarying resistor R4.

A switch S allows short-circuiting the thyristor T and the diode D1 so as to feed the motor with its nominal voltage.

When the terminal $b$ is positive with reference to the terminal $a$ the diode D1 is conductive and the condenser C1 is charged through the resistors R1 and R3 in parallel with the resistors R2 and R4. In principle, the switch S is open, except when it is desired to make the motor M revolve at its higher speed.

As soon as the voltage across the condenser C1 reaches the critical voltage of the Zener diode D2, the latter becomes conductive and the currents passing through the resistors R1, R2, R3 and R4 feed the electrode controlling the thyristor T which becomes thus conductive. At such a moment, the resistors referred to are in parallel with the condenser C1 and a discharge current is established until the end of the duration of the positive alternation at the terminal $b$, at which moment the thyristor ceases being conductive. Said discharge current is independent of the voltage of the mains. Any large modification of the latter produces therefore only a modification in the phase angle of ignition of the thyristor.

It is thus obvious that the condenser C1 reaches more or less speedily the Zener voltage of the diode D2 according to the value selected for the variable resistor R2. Adjustment of said resistance allows therefore defining the phase angle of ignition of the thyristor T for the alternations during which the terminal $b$ is positive with reference to the other terminal $a$. The resistor R4 limits the charging current of the condenser C1 when R2 = 0. At the beginning of the following alternation, the terminal $a$ becomes positive with reference to the terminal $b$ and the diode D1 and also the thyristor T cease being conductive. It should be noted that the diode D1 is inserted in series with the thyristor T, so as to protect the latter against any possible overvoltage.

As a consequence of the reversal in polarity, the current in the condenser C1 is reversed. The condenser is connected with the terminal $b$ through the resistors R1 and R3, the value of which is selected so as to be large enough to keep the discharge current of the condenser at a level low enough for a disturbing reversal of polarity across the terminals of the condenser C1 to be impossible.

Assuming the adjusting system disclosed has been designed so as to operate with a motor under 110 volts, the values of the resistors R2 and R4 have been selected so that, when the switch S is open, the ignition of the thyristor T produces the minimum current required for the driving of the motor M at a low speed. If the system described were not to include the nonlinear resistor R and if said system were to be used without any modification for operation with a 220 volt mains, the motor M being of course in such a case a universal commutator motor running under 220 volts, obviously then the Zener voltage for the diode D2 would be reached by the condenser C1 within a shorter time and the influence of the resistors R1, R3 and R2, R4 on the discharge of the condenser C1 when the thyristor is conductive would be smaller. This would result in a lead of the moment of ignition of the thyristor T and therefore there would be obtained for the motor M a substantially higher speed in the case of a motor running under 220 volts than in the case of a motor running under 110 volts.

The resistor R3 is provided with a symmetrical nonlinear characteristic curve of the VDR type, which means that the value of said resistor is reduced when the current passing through it increases. Through this lack of linearity, the system of resistors R1 and R3 shows a higher conductivity when the system is connected with 220 volt mains than in the case of 110 volt mains.

This results in that the discharge current fed by the condenser C1 through said resistors R1 and R3 while the terminal $a$ is positive increases to a more considerable extent than the loading current passing through the system of resistors R1 and R3 in parallel with R2 and R4. This increase in the discharge current has for its result to delay the moment at which the condenser ignites the thyristor and to provide a compensation for the lead of said moment of ignition ascribable to the use of the arrangement disclosed when a higher voltage is applied by the mains.

A suitable ratio being selected for R1 and R3 and taking into account the characteristic properties of the motor M, it is possible to produce an adjusting system wherein each position of the variable resistance R2 allows obtaining the same speed for the motor M, the latter being indifferently of the 110 volt type connected with corresponding mains or else of the 220 volt type connected with corresponding mains or else of the double voltage type connected with the mains corresponding to either of its two nominal voltages.

Obviously, the same result may be achieved otherwise and instead of connecting in series with the resistor R1 a resistor R3 having a characteristic curve of the VDR type, it is possible to obtain a same compensating result by inserting in series with R2 a nonlinear resistor of which the coefficient of resistance increases together with the intensity of the current.

The nonlinear resistor R3 may also be replaced by two Zener diodes inserted in series and showing opposite polarities.

I claim:

1. Apparatus for adjusting the speed of a universal motor fed by a source of alternating current, so that the speed is substantially independent of the nominal voltage of the source, said apparatus comprising a controlled diode having a pair of output electrodes connected in series circuit with the motor across said source of alternating current, said controlled diode having an input electrode controlling the conductive condition of said controlled diode, a control circuit including a condenser and variable resistor connected in series across the said pair of output electrodes of said controlled diode, a junction connecting said condenser and said variable resistor, said junction being connected with said input electrode controlling said diode, and an auxiliary circuit including resistance means and a rectifier connected with said control circuit and said series circuit, said rectifier being connected in series with said controlled diode on the opposite side of said controlled diode from said motor, said resistance means having one terminal connected to said series circuit, and the other terminal connection with said control circuit junction, said rectifier being connected relative to said resistor and to said resistance means to connect only said resistance means in the control circuit during an alteration of one polarity of the source and both said resistor and resistance means in the control circuit during an alternation of opposite polarity of the source to produce different time constants for the two alternations of the period of the alternating current feeding the motor, said resistance means comprising a resistor having a nonlinear characteristic curve to compensate the influence of the nominal voltage of different sources feeding the motor.

2. An arrangement as claimed in claim 1, wherein the resistor having a nonlinear characteristic is a resistance of the VDR type.